(12) United States Patent
Fujioka et al.

(10) Patent No.: US 6,217,472 B1
(45) Date of Patent: Apr. 17, 2001

(54) METAL V-BELT

(75) Inventors: Hiroshi Fujioka; Kouhei Ohsono, both of Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/338,805

(22) Filed: Jun. 23, 1999

(30) Foreign Application Priority Data

Jun. 26, 1998 (JP) .................................................. 10-179959

(51) Int. Cl.⁷ ......................................................... F16G 5/16
(52) U.S. Cl. ............................................. 474/242; 474/201
(58) Field of Search ................................... 474/242, 240, 474/201

(56) References Cited

U.S. PATENT DOCUMENTS

| | | | |
|---|---|---|---|
| 4,482,339 | * 11/1984 | Miki et al. | 474/28 |
| 4,512,753 | * 4/1985 | Hattori | 474/201 X |
| 4,642,077 | * 2/1987 | Hattori et al. | 474/201 |
| 4,698,050 | * 10/1987 | Hattori et al. | 474/242 |
| 4,768,999 | * 9/1988 | Chana et al. | 474/242 |
| 5,004,450 | * 4/1991 | Ide | 474/242 |
| 6,090,004 | * 7/2000 | Kanehara et al. | 474/242 |
| 6,123,637 | * 9/2000 | Yagasaki | 474/242 |

FOREIGN PATENT DOCUMENTS

| | | |
|---|---|---|
| 62-131143 U | 8/1987 | (JP) . |
| 2-225840 | 9/1990 | (JP) . |
| 7-12177 | 1/1995 | (JP) . |

* cited by examiner

*Primary Examiner*—Charles A Marmor
*Assistant Examiner*—Ankur Parekh
(74) *Attorney, Agent, or Firm*—Armstrong, Westerman, Hattori, McLeland & Naughton, LLP

(57) ABSTRACT

A metal V-belt for transmitting power, looped between a drive pulley 6 and a driven pulley 11, and comprising endless belt-form metal rings 31 and numerous metal elements supported along these metal rings, wherein the metal rings comprise a plurality of thin, endless belt-form metal ring sheets 33(1) to 33(n) superposed in the radial direction, and of these, the thickness of the innermost metal ring sheet 33(1) is set to be less than the thickness of the other metal ring sheets 33(2) to 33(n). Here, the thickness of the innermost metal ring sheet is set on the basis of the ratio of the coefficient of friction between the innermost metal ring sheet and the metal element members to the coefficient of friction between the other metal ring sheets.

8 Claims, 15 Drawing Sheets

METAL V-BELT

FIELD OF THE INVENTION

The present invention relates to a metal V-belt used for the transmission of power in a V-belt continuously variable transmission or the like, and more particularly to a metal V-belt characterized in the configuration of the endless belt-form metal ring member that constitutes this metal V-belt.

BACKGROUND OF THE INVENTION

Metal V-belts such as this have been known for some time, and are disclosed, for example, in Japanese Utility Model Laid-Open No. 62-131143, Japanese Patent Laid-Open No. 2-225840, and Japanese Patent Laid-Open No. 7-12177. These metal V-belts used in the past comprise an endless belt-form metal ring member and numerous metal element members (also called metal links) supported along this metal ring member, and are looped between a drive pulley and a driven pulley so as to transmit power. These two pulleys are designed so that the width of the V-groove thereof can be varied, and are designed so that the loop radius of the V-belt can be varied and the gear ratio continuously varied by varying this V-groove width.

When power is transmitted between the two pulleys by a metal V-belt such as this, the metal element members are pushed upon while the power is transmitted, so that the power is transmitted by the compression force acting on the metal element members. At this time a tensile force acts on the metal ring member that ties the numerous metal element members together in a ring, and flexural stress that varies with the rotation also acts on this metal ring member while the V-belt is looped and rotating between the two pulleys, with the tension and flexion repeatedly acting according to the rotational period of the metal V-belt between the two pulleys.

It is therefore necessary to take into account the tensile and flexural stress that thus repeatedly act on the metal ring member, and to optimize the material, shape, and so on thereof so that the strength and service life will be satisfactory with respect to this repeated stress. The metal ring member generally comprises a plurality of superposed, thin, endless belt-form metal ring sheets, and since power is transmitted in a state in which the innermost metal ring sheet is in contact with the metal element members, it is necessary at the design stage thereof to take into account the coefficient of friction between the metal ring sheets themselves and the coefficient of friction between the metal ring sheets and the metal elements.

Flexural stress can be unequivocally determined by the loop radius of the two pulleys, but tensile stress varies with each metal ring sheet depending on the above-mentioned coefficient of friction. In general, the coefficient of friction between the metal ring sheets (ring-ring coefficient of friction) is smaller than the coefficient of friction between the metal ring sheets and the (saddle surfaces of the) metal elements (ring-element coefficient of friction), so the change in tension is greatest at the innermost metal ring sheet, and when all of the metal ring sheets have the same thickness, the change in tensile stress is greatest for the innermost metal ring sheet. In the past, the metal rings comprised a plurality of metal ring sheets of the same material and the same thickness superposed in the radial direction, so the stress conditions were most severe at the innermost metal ring sheet for the above reason, and the innermost metal ring sheet was the most problematic in terms of strength and service life.

SUMMARY OF THE INVENTION

The present invention was conceived in light of the foregoing, and an object thereof is to extend the total service life as much as possible and obtain a metal V-belt with a long service life by decreasing the thickness of, and thereby reducing flexural stress in, the innermost metal ring sheet where the tensile stress conditions are harshest.

In order to achieve this object, the present invention is a metal V-belt for transmitting power, looped between a drive pulley and a driven pulley, and comprising an endless belt-form metal ring member ( such as the metal ring 31 in the embodiment) and numerous metal element members (such as metal elements 32 in the embodiment) supported along this metal ring member, wherein the metal ring member comprises a plurality of thin, endless belt-form metal ring sheets (such as metal ring sheets 33(1) to 33(n) in the embodiment) superposed in the radial direction, and of these plurality of metal ring sheets, the thickness of the innermost metal ring sheet ( such as metal ring sheet 33(1) in the embodiment) is made less than the thickness of the other metal ring sheets ( such as metal ring sheets 33(2) to 33(n) in the embodiment).

Furthermore, it is preferable for the thickness of the innermost metal ring sheet to be set on the basis of the ratio of the coefficient of friction between the innermost metal ring sheet and the metal element members to the coefficient of friction between the other metal ring sheets.

There is less flexural stress in the innermost metal ring sheet when this metal ring sheet is thus made thinner. Still, because of the large coefficient of friction between the innermost metal ring sheet and the metal elements as mentioned above, it must be remembered that making the innermost metal ring sheet thinner increases the change in tensile stress. In the present invention, the optimal thickness is set by taking into consideration the increase in tensile stress and the decrease in flexural stress resulting from a reduction in the thickness of the innermost metal ring sheet. Flexural stress simply decreases according to changes in thickness, but the increase in tensile stress varies according to the coefficient of friction between the innermost metal ring sheet and the metal element member (ring-element coefficient of friction) and the coefficient of friction between the other metal ring sheets (ring-ring coefficient of friction), so the optimal thickness is set on the basis of these two coefficients of friction.

In this case, it is preferable for the repeated stress amplitude $\sigma a$ and the mean stress $\sigma m$ applied to the innermost metal ring sheet when the metal V-belt is looped between the drive pulley and the driven pulley to transmit power to be taken into account, and for the thickness of the innermost metal ring sheet to be set so as to maximize the fatigue life of the innermost metal ring sheet when repeatedly subjected to the stress amplitude $\sigma a$ and the mean stress $\sigma m$. The stress amplitude $\sigma a$ and the mean stress $\sigma m$ here are both a combination of flexural stress and tensile stress, and the thickness setting can be performed under optimal conditions combining both the reduction in flexural stress and the increase in tensile stress resulting from a reduced metal ring sheet thickness.

It is preferable for the thickness of the innermost metal ring sheet to be set so as to maximize the fatigue life of the innermost metal ring sheet, as long as the fatigue life of the innermost metal ring sheet, produced by the repeated load acting thereon when the V-belt is looped between the drive pulley and the driven pulley to transmit power, is less than the fatigue life of the other metal ring sheets. This fatigue life can be extended by making the innermost metal ring sheet thinner, but depending on the coefficient of friction conditions, the fatigue life of the innermost metal ring sheet may be greater than the fatigue life of the other metal ring sheets, in which case it is best to set the thickness so as to maximize the fatigue life of the innermost metal ring sheet while not exceeding the fatigue life of the other metal ring sheets. This allows the thickness of all of the metal ring sheets to be optimized and the fatigue life of the metal V-belt as a whole to be maximized.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention and wherein.

DESCRIPTION OF THE PREFERRED EMBODIMENTS

Figure 1:
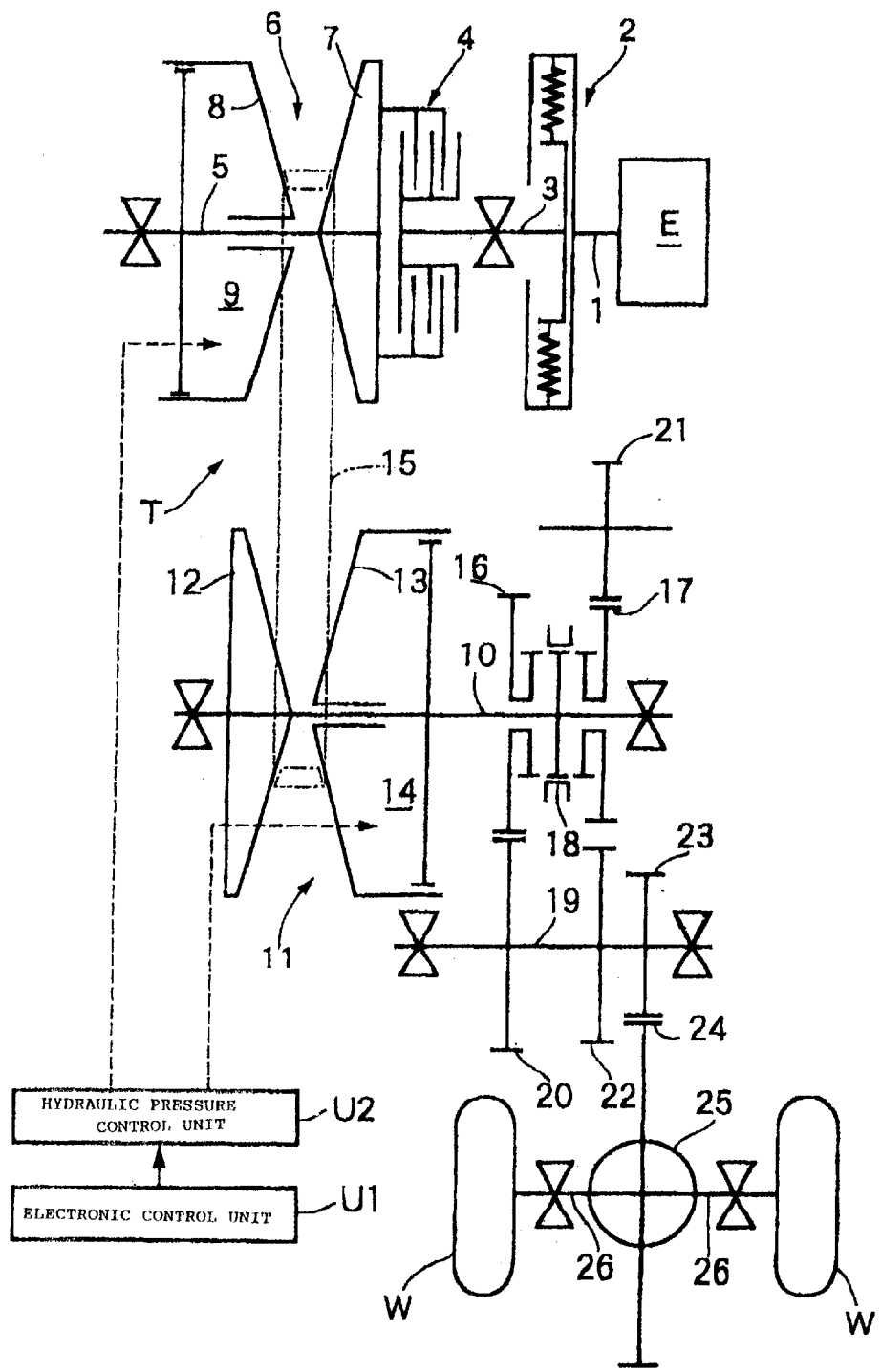
FIG. 1 is a schematic of the power transmission path of a belt-type continuously variable transmission that makes use of the metal V-belt pertaining to the present invention.

FIG. 1 illustrates the power transmission path of a metal belt-type continuously variable transmission T that has the metal V-belt pertaining to the present invention. An input shaft 3, which is connected via a damper 2 to the crankshaft 1 of an engine E, is connected via a takeoff clutch 4 to the drive shaft 5 of the continuously variable transmission T. A drive pulley 6 provided to the drive shaft 5 comprises a stationary-side pulley half 7 that is fixed to the drive shaft 5, and a movable-side pulley half 8 that is opposite this stationary-side pulley half 7 and is provided such that it can move in the axial direction and rotates integrally with the drive shaft 5. The movable-side pulley half 8 is urged toward the stationary-side pulley half 7 by hydraulic pressure acting on a fluid chamber 9. Accordingly, a V-groove is formed varied by moving the movable-side pulley half 8 in the axial direction under the hydraulic pressure acting on the fluid chamber 9.

A driven shaft 10 is disposed parallel to the drive shaft 5, and a driven pulley 11 provided to this driven shaft 10 comprises a stationary-side pulley half 12 that is fixed to the driven shaft 10, and a movable-side pulley half 13 that is opposite this stationary-side pulley half 12 and is provided such that it can move in the axial direction and rotates integrally with the driven shaft 10. The movable-side pulley half 13 is urged toward the stationary-side pulley half 12 by hydraulic pressure acting on a fluid chamber 14. Accordingly, a V-groove is formed between the two pulley halves 12 and 13, and the width of the V-groove can be varied by moving the movable-side pulley half 13 in the axial direction under the hydraulic pressure acting on the fluid chamber 14.

Figure 2:
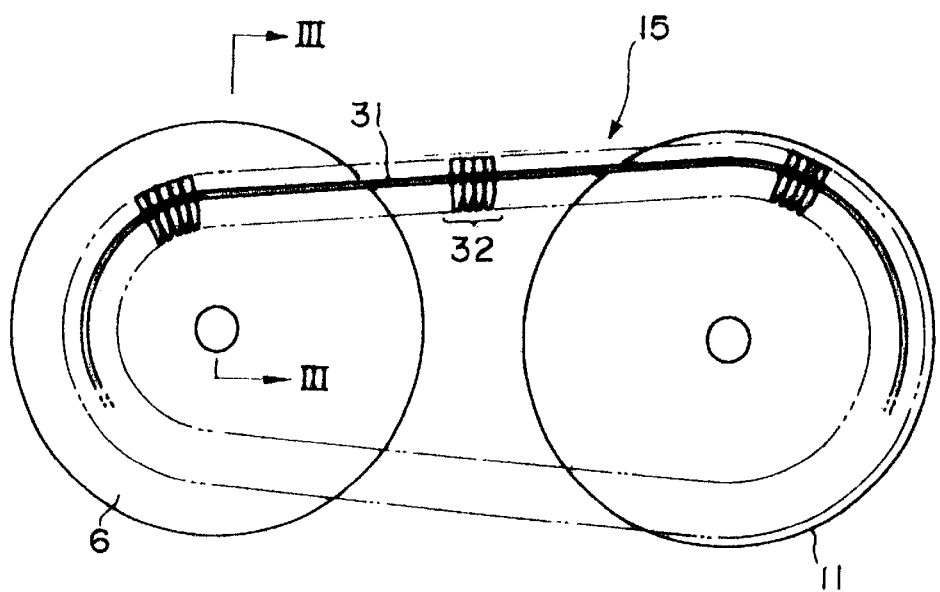
FIG. 2 is a diagram illustrating the state in which this metal V-belt has been looped around drive and driven pulleys.

A metal V-belt 15 is looped between the drive pulley 6 and the driven pulley 11. This state is shown in FIG. 2. The metal V-belt 15 comprises an endless belt-form metal ring 31 and numerous metal elements (metal links) 32 supported along this metal ring 31, and transmits power when looped between the drive pulley 6 and the driven pulley 11, the each of which has a variable V-groove width.

Figure 3:
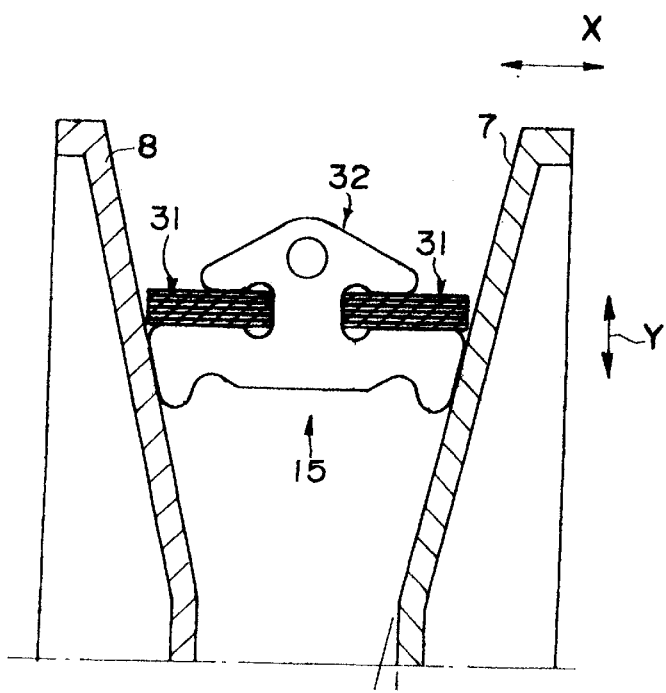
FIG. 3 is a cross section of the metal V-belt when looped around the drive pulley.

A state in which the metal V-belt 15 is looped around the drive pulley 6 is shown in FIG. 3, where the metal elements 32 are fitted into the V-groove of the drive pulley 6 comprising the stationary pulley half 7 and the movable pulley half 8. Controlling the system such that the movable pulley half 8 is moved in the axial direction (X direction) allows the metal elements 32 to be moved in the radial direction (Y direction), and allows the loop radius of the metal V-belt 15 to be varied with respect to the drive pulley 6. Similarly, the loop radius of the metal V-belt can be varied for the driven pulley 11 as well, and controlling the loop radii of both pulleys makes it possible to continuously adjust the gear ratio between the pulleys 6 and 11.

Figure 4:
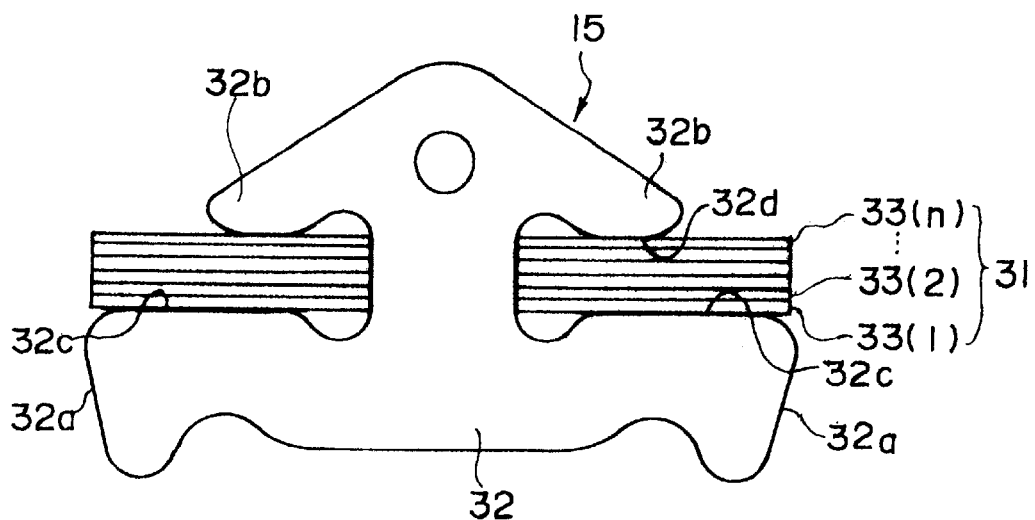
FIG. 4 is a front cross section of the metal V-belt.
Figure 5:
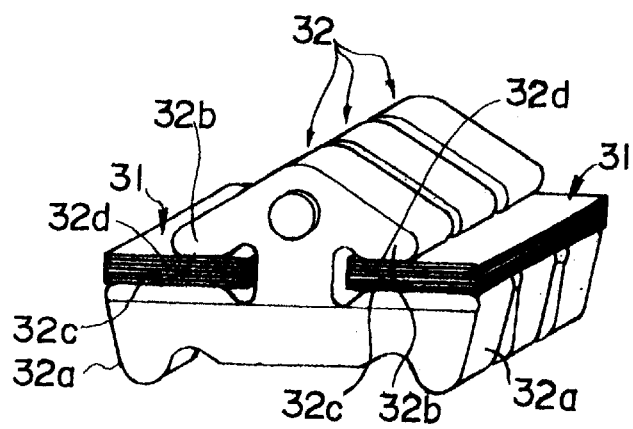
FIG. 5 is an oblique view of the metal V-belt.

This metal V-belt 15 is shown in detail in FIGS. 4 and 5. The metal elements 32 are made in a shape having a body with V-surfaces 32a on the left and right ends, and ears 32b that extend upward and out to the left and right from the center of this body. A smooth saddle surface 32c is formed on the left and right upper surfaces of the body, and a smooth support surface 32d is formed on each of the lower surfaces of the left and right ears. A pair of slots is formed in between the saddle surfaces and the support surfaces, and a pair of the metal ring members 31 is inserted into these slots on the left and right, so that numerous metal elements 32 are disposed along the metal rings 31. This constitutes the metal V-belt 15.

Here, the metal ring 31 comprises a plurality (12, for example) thin endless belt-form metal ring sheets 33(1), 33(2), ... 32(n) superposed in the radial direction. Of these metal ring sheets, the thickness of the innermost metal ring sheet 32(1) is made less than the thickness of the other metal ring sheets 32(2) to 32(n). The other metal ring sheets 32(2) to 32(n) all have the same thickness.

Returning to FIG. 1, a forward drive gear 16 and a reverse drive gear 17 are relatively rotatably supported by the driven shaft 10 to which power is transmitted by the metal V-belt 15 in the above manner. The forward drive gear 16 and the reverse drive gear 17 can be selectively linked to the driven shaft by a selector 18. A forward driven gear 20 that meshes with the forward drive gear 16, and a reverse driven gear 22 that meshes with the reverse drive gear 17 via a reverse idle gear 21 are fastened to an output shaft 19 disposed parallel to the driven shaft 10.

The rotation of the output shaft 19 is inputted via a final drive gear 23 and a final driven gear 24 to a differential 23 from which it is transmitted via left and right axles 26 to drive wheels W.

As described above, the drive force of the engine E is transmitted to the driven shaft 10 via the crankshaft 1, the damper 2, the input shaft 3, the takeoff clutch 4, the drive shaft 5, the drive pulley 6, the metal V-belt 15, and the driven pulley 11. When the forward travel range is selected, the drive force of the driven shaft 10 is transmitted via the forward drive gear 16 and the forward driven gear 20 to the output shaft 19, causing the vehicle to travel forward. When the reverse travel range is selected, the drive force of the driven shaft 10 is transmitted via the reverse drive gear 17 and the reverse idle gear 21 to the output shaft 19, causing the vehicle to travel in reverse.

The gear ratio here is continuously adjusted by controlling the hydraulic pressure acting on the fluid chamber 9 of the drive pulley 6 and the fluid chamber 14 of the driven pulley 11 in the metal belt-type continuously variable transmission T with a hydraulic pressure control unit U2 that is actuated by a command from an electronic control unit U1. Specifically, if the hydraulic pressure acting on the fluid chamber 14 of the driven pulley 11 is increased relative to the hydraulic pressure acting on the fluid chamber 9 of the drive pulley 6, the groove width of the driven pulley 11 will decrease and the loop radius (effective radius) will increase, and this will be accompanied by an increase in the groove width and a reduction in the loop radius of the drive pulley 6, so the gear ratio of the metal belt-type continuously variable transmission T will change continuously toward low gear. Conversely, if the hydraulic pressure acting on the fluid chamber 9 of the drive pulley 6 is increased relative to the hydraulic pressure acting on the fluid chamber 14 of the driven pulley 11, the groove width of the drive pulley 6 will decrease and the loop radius will increase, and this will be accompanied by an increase in the groove width and a reduction in the loop radius of the driven pulley 11, so the gear ratio of the metal belt-type continuously variable transmission T will change continuously toward top gear.

Figure 6:
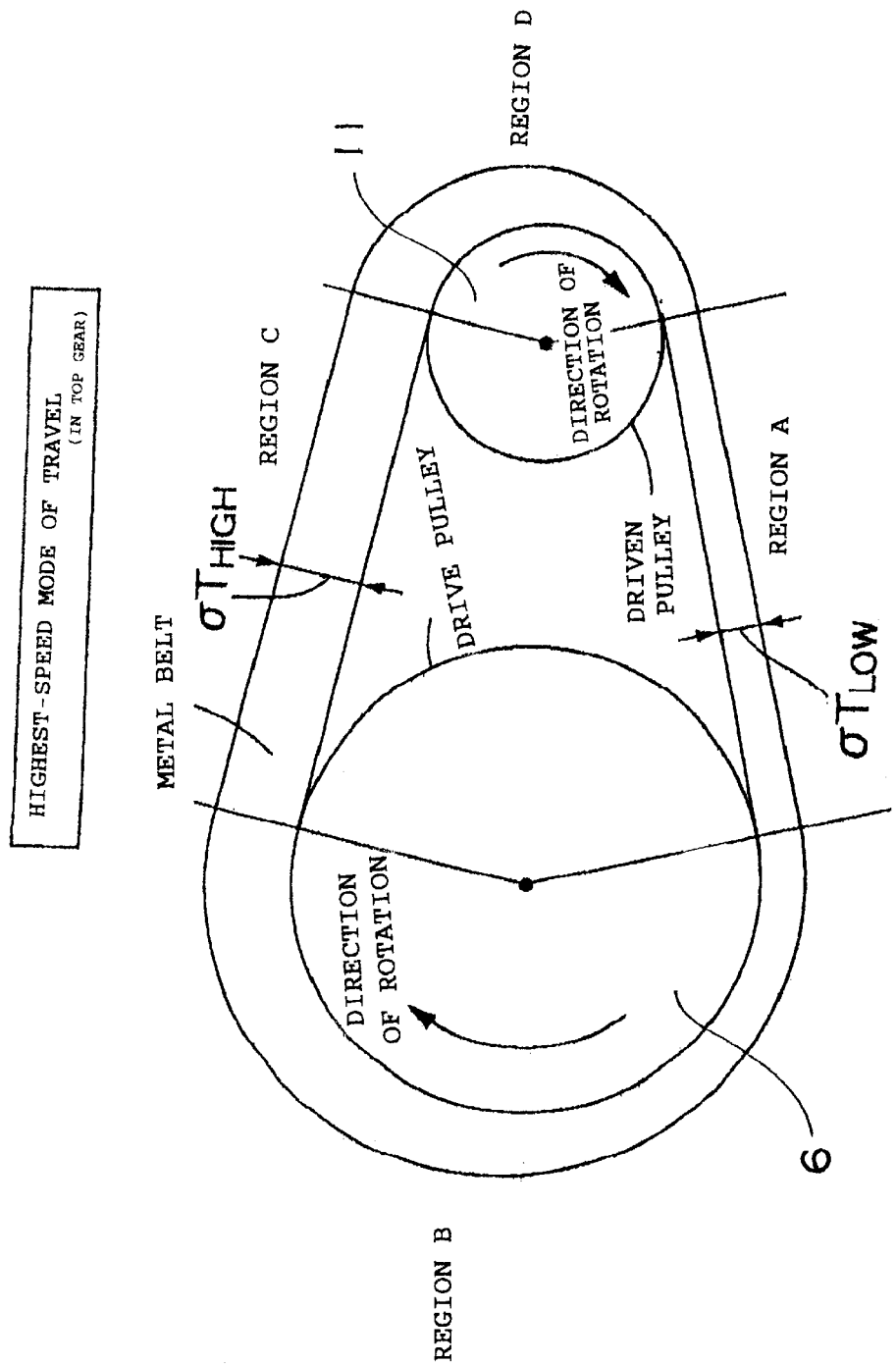
FIG. 6 is a diagram the tensile stress that acts on the metal ring.

FIG. 6 shows the state when the vehicle is in its highest-speed mode of travel (in top gear) and the loop radius of the drive pulley 6 is greater than the loop radius of the driven pulley 11. The thickness of the metal V-belt 15 in the figure schematically illustrates how large a tensile force is acting on the metal rings 31. As shown in the figure, the tensile force is at a constant value $T_{LOW}$ in the return arc section (region A) in which the metal V-belt 15 returns from the driven pulley 11 to the drive pulley 6, while the tensile force is at a constant value $T_{HIGH}$ in the outgoing arc section (region C) in which the metal V-belt 15 is sent out from the drive pulley 6 to the driven pulley 11. Here, the tensile force $T_{LOW}$ in region A is less than the tensile force $T_{LOW}$ region C. In the portion where the metal V-belt 15 loops around the drive pulley 6 (region B), the tensile force gradually increases from $T_{LOW}$ to $T_{HIGH}$ from the entry side to the exit side thereof, and in the portion where the metal V-belt 15 loops around the driven pulley 11 (region D), the tensile force gradually increases from $T_{HIGH}$ to $T_{LOW}$ from the entry side to the exit side thereof.

The above-mentioned tensile force acting on the metal V-belt 15 is evenly borne by the left and right metal rings 31, and the tension on the metal rings 31 is borne by the various metal ring sheets 33(1) to 33(n) that constitute these metal rings 31. Here, the tensile stress of the second to nth (n=12) metal ring sheets 33(2) to 33(n) (excluding the innermost metal ring sheet 33(1) in contact with the saddle surfaces 32c of the metal elements 32) is mutually equivalent, but the tensile stress of the innermost metal ring sheet 33(1) is different from the tensile stress of the second to nth (n=12) metal ring sheets 33(2) to 33(n). The reason for this will now be described through reference to FIG. 7.

Figure 7:
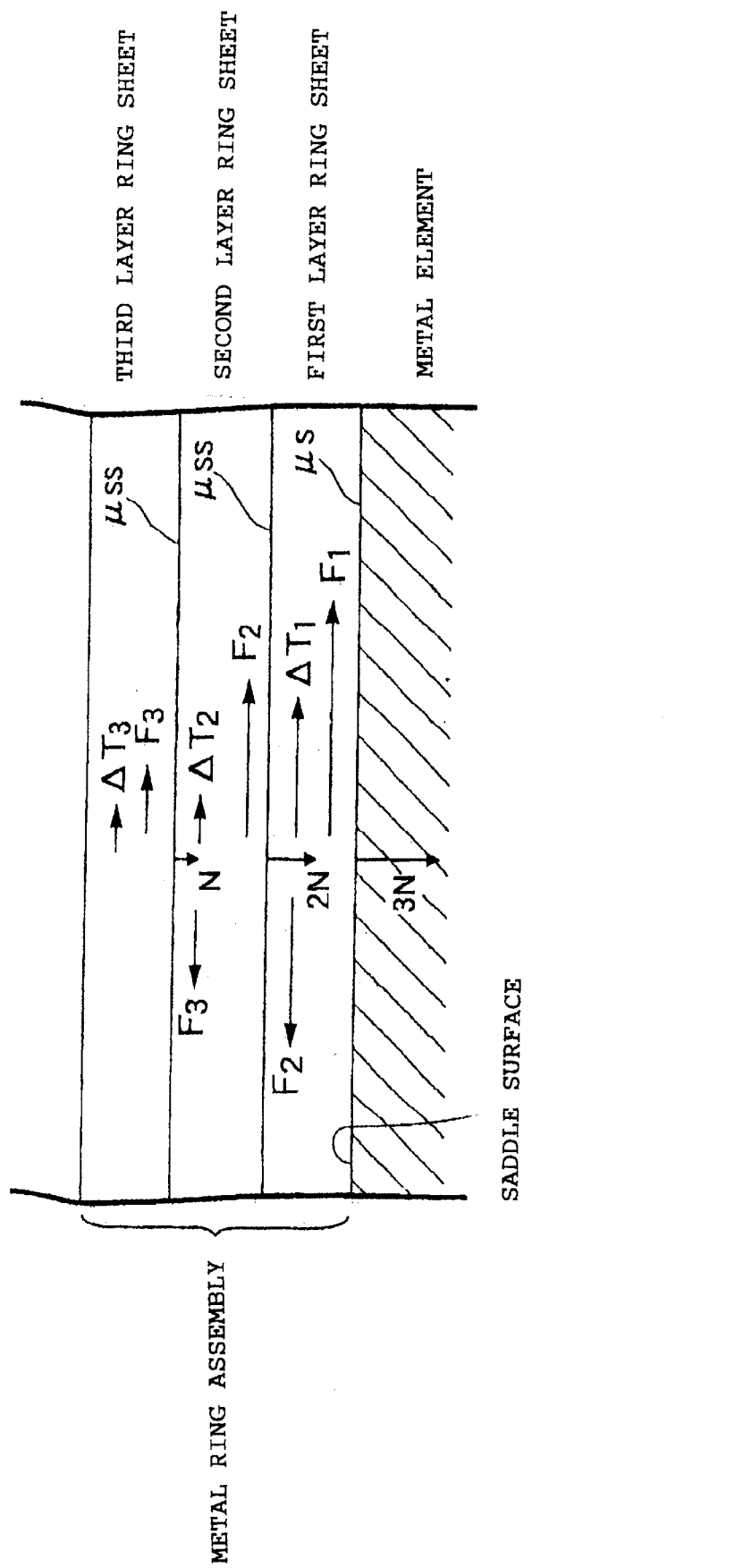
FIG. 7 is a diagram of the balance between the forces acting on the metal V-belt.

First, as a simple model, let us consider a case in which the metal rings consist of three layers of metal ring sheets, as shown in FIG. 7. If we let N be the vertical resistance acting on the outermost third layer metal ring sheet and on the second layer metal ring sheet to the inside thereof in the part looped around the pulley, then the vertical resistance acting between the second layer metal ring sheet and the first layer metal ring sheet is 2N, and the vertical resistance acting between the first layer metal ring sheet and the saddle surfaces of the metal elements is 3N. Here, if we let $\mu$ss be the coefficient of friction between the metal rings in contact with each other (hereinafter referred to as the ring-ring coefficient of friction), $\mu$s be the coefficient of friction between the metal ring sheets and the metal elements (hereinafter referred to as ring-element coefficient of friction), and F1, F2, and F3 be the tensile loads borne by the first layer metal ring sheet, second layer metal ring sheet, and third layer metal ring sheet, respectively, then $\Delta T1$, $\Delta T2$, and $\Delta T3$, which are the changes in tensile force of the respective layers of metal rings, are given by the following formulas (1) to (3).

$$\Delta T3 = F3 = \mu ss \cdot N \quad (1)$$

$$\Delta T2 = F2 - F3 = 2\mu ss \cdot N - \mu ss \cdot N = \mu ss \cdot N \quad (2)$$

$$\Delta T1 = F1 - F2 = 3 \ s \cdot N - 2 \ \mu ss \cdot N \quad (3)$$

As can be seen from these formulas, the amounts of tensile force change $\Delta T2$ and $\Delta T3$ of the second layer metal ring sheet and the third layer metal ring sheet, for which the coefficient of friction $\mu$ss of the inner peripheral surface is equal, are both equal to $\mu$ss·N, but the tensile force change $\Delta T1$ acting on the first layer metal ring sheet, for which the coefficient of friction of the inner peripheral surface is $\mu$s, is different from the above-mentioned amounts of change $\Delta T2$ and $\Delta T3$ (3 $\mu$s·N−2 $\mu$ss·N). The ratio of $\Delta T1$ and $\Delta T2$ ($\Delta T1/\Delta T2$) is given by the following formula (4), and if this formula (4) is expanded to when the number of layers of metal ring sheets is n, we obtain the following formula (5).

$$\Delta T1/\Delta T2 = (3\ \mu s \cdot N - 2\ \mu ss \cdot N)/(\mu ss \cdot N) \quad (4)$$

$$\Delta T1/\Delta T2 = \{n\mu s - (n-1) \cdot \mu ss\}/\mu ss \quad (5)$$

Here, if we let Mr (=$\mu$s/$\mu$ss) be the coefficient of friction ratio, which is the ratio of the ring-element coefficient of friction $\mu$s to the ring-ring coefficient of friction $\mu$ss, the above-mentioned formula (5) can be rewritten as the following formula (6).

$$\Delta T1/\Delta T2 = n \cdot Mr - (n-1) = n(Mr-1)+1 \quad (6)$$

The sum $\Delta T_{ALL}$ of the tension change amounts $\Delta T1$ to $\Delta Tn$ of the n number of metal ring sheets that make up the metal ring is given by the following formula (7), and if we cancel $\Delta T2$ from this formula (7) and from the above formula (6), we obtain the following formula (8).

$$\begin{aligned}\Delta T_{ALL} &= \Delta T1 + \Delta T2 + \ldots \Delta Tn \quad (7)\\ &= (n-1)\cdot \Delta T2 + \Delta T1\\ &= (n-1)\cdot \Delta T2 + \{n(Mr-1)+1\}\cdot \Delta T2\\ &= n\cdot Mr \cdot \Delta T2\end{aligned}$$

$$\Delta T1/\Delta T_{ALL} = \{n(Mr-1)+1\}/(n\cdot Mr) \quad (8)$$

According to the above formula (8), it can be seen that if we determine the number of layers of metal ring sheets included in the metal ring, and determine the coefficient of friction ratio Mr, which is the ratio of the ring-element coefficient of friction $\mu$s to the ring-ring coefficient of friction $\mu$ss, then the proportion of the tension change amount $\Delta T1$ of the innermost metal ring sheet to the tension changes $\Delta T_{ALL}$ of all of the metal rings will be determined.

Figure 8:
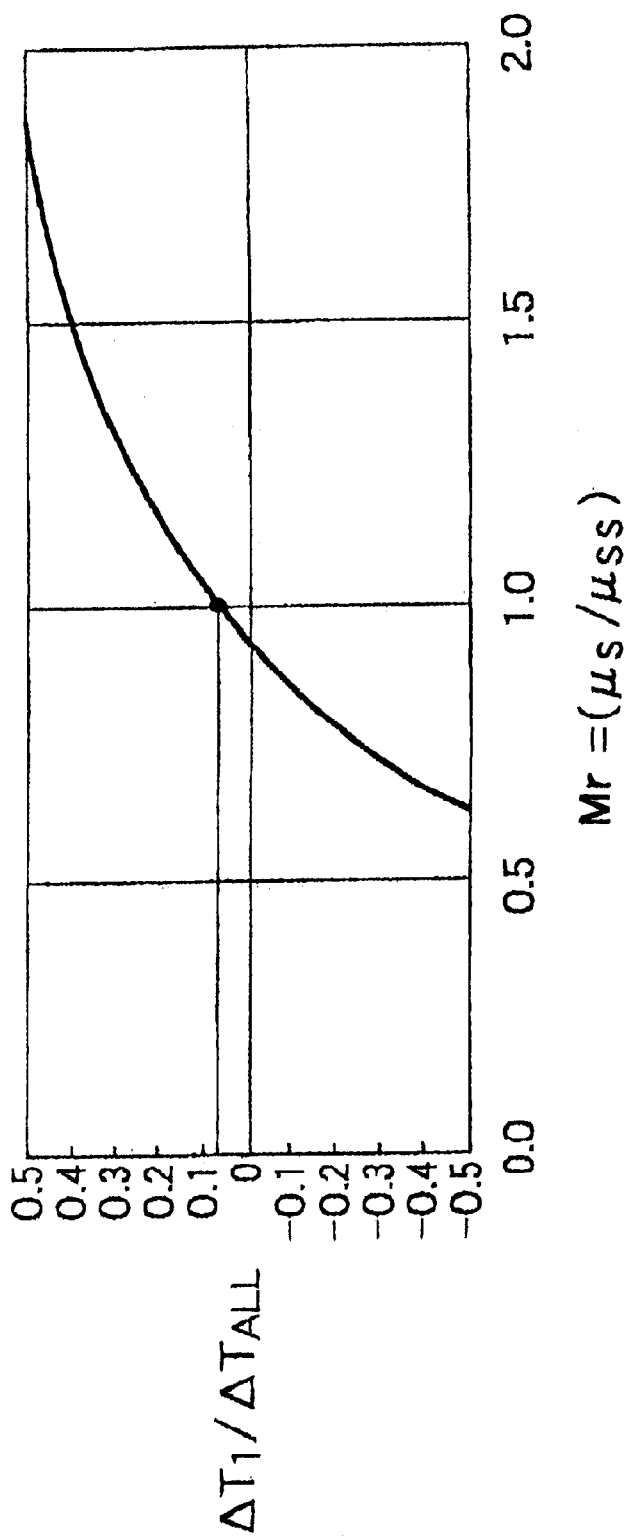
FIG. 8 is a graph of the changes in $\Delta T1/\Delta_{TALL}$ with respect to the coefficient of friction ratio Mr.

The graph in FIG. 8 shows the results of calculating the value of $\Delta T1/\Delta T_{ALL}$ for various coefficient of friction ratios Mr when the metal ring is made up of 12 metal ring sheets. According to past experience and experimental results, if the innermost metal ring sheet and the other metal ring sheets are made of the same material, the ring-element coefficient of friction $\mu$s will be greater than the ring- ring coefficient of friction $\mu$ss, so the coefficient of friction ratio Mr=$\mu$s/$\mu$ss will be a value greater than 1.0.

Let us for a moment assume that the ring-element coefficient of friction $\mu$s is the same as the ring- ring coefficient of friction $\mu$ss. The coefficient of friction ratio Mr=1.0 and $\Delta T1/\Delta_{T\ ALL} = 0.08$, and the change in the innermost metal ring sheet is the same amount as in the other 11 metal ring sheets, that is, it accounts for approximately 8% (i.e., $\frac{1}{12}$) of the sum $\Delta T_{ALL}$ of the tension change amounts of all of the metal rings. Actually, however, since the coefficient of friction ratio Mr is greater than 1.0, the tension change amount $\Delta T1$ of the innermost metal ring sheet is greater than the tension change amount $\Delta Tn$ of each of the other 11 metal ring sheets (constant for the 11 metal ring sheets).

Figure 9:
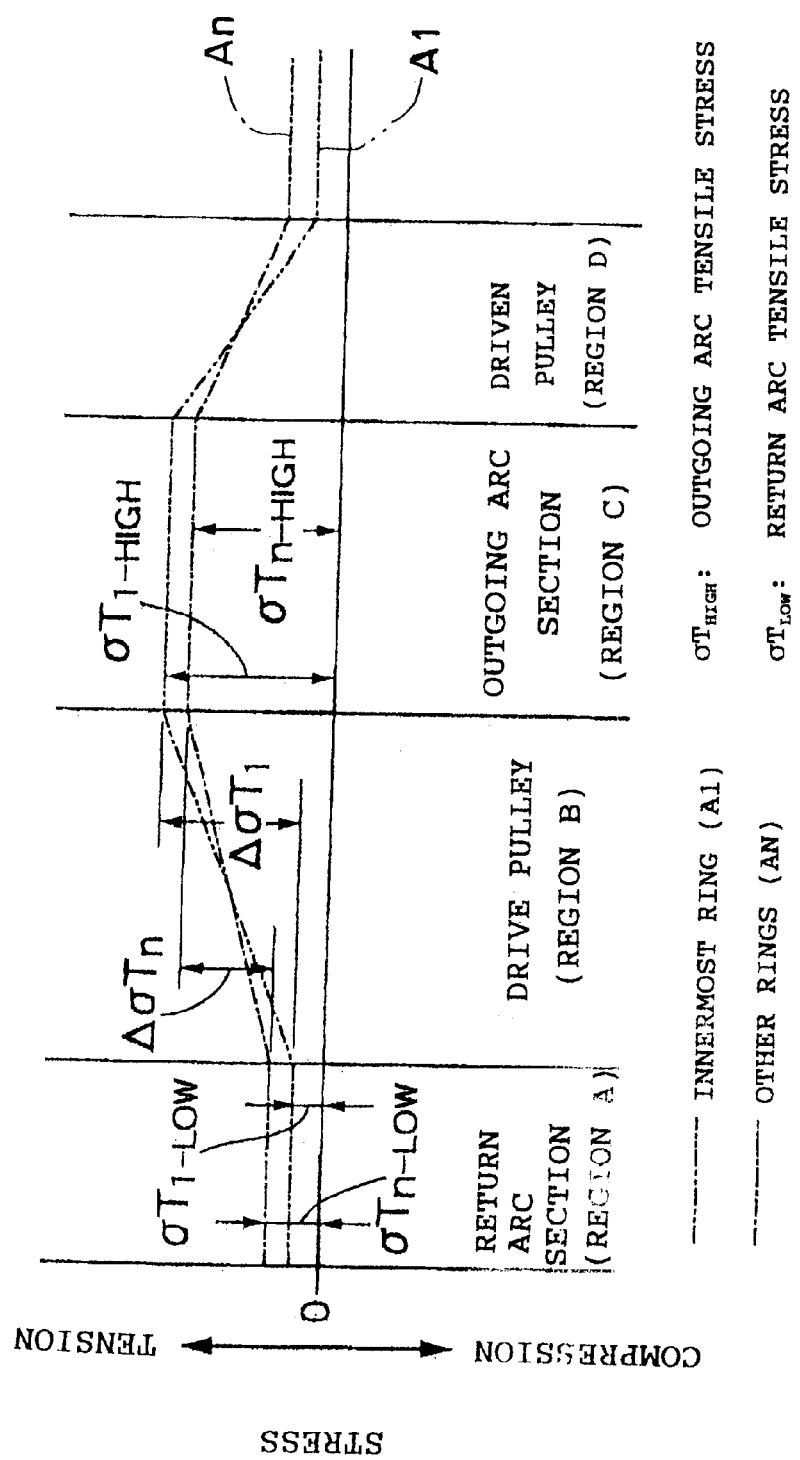
FIG. 9 is a graph of the changes in the tensile stress that acts on the inner peripheral surface of the metal ring sheets.

The graph in FIG. 9 shows the change in the tensile stress $\sigma T1$ of the innermost metal ring sheet and the change in the tensile stress $\sigma Tn$ of the other 11 metal ring sheets when the vehicle is in its highest-speed mode of travel as shown in FIG. 6. The two-dot chain line A1 in this figure indicates the change in the tensile stress $\sigma T1$ of the innermost metal ring sheet, while the one- dot chain line An indicates the change in the tensile stress $\sigma Tn$ of the other 11 metal ring sheets. As the above-mentioned ring-element coefficient of friction $\mu$s is different from the ring-ring coefficient of friction $\mu$ss, the tension change amount $\Delta T1$ of the innermost metal ring sheet (that is, the stress change amount $\Delta T1$) is greater than the tension change amount $\Delta Tn$ of the other 11 metal ring sheets (that is, the stress change amount $\Delta \sigma Tn$). As a result, the smallest tensile stress $\sigma T1$ (LOW) of the innermost metal ring sheet is smaller than the tensile stress $\sigma Tn$ (LOW) of the other metal ring sheets in the return arc section (region A), while the largest tensile stress $\sigma T1$ (HIGH) of the innermost metal ring sheet is larger than the tensile stress $\sigma Tn$ (HIGH) of the other metal ring sheets in the outgoing arc section (region C).

Figure 10:
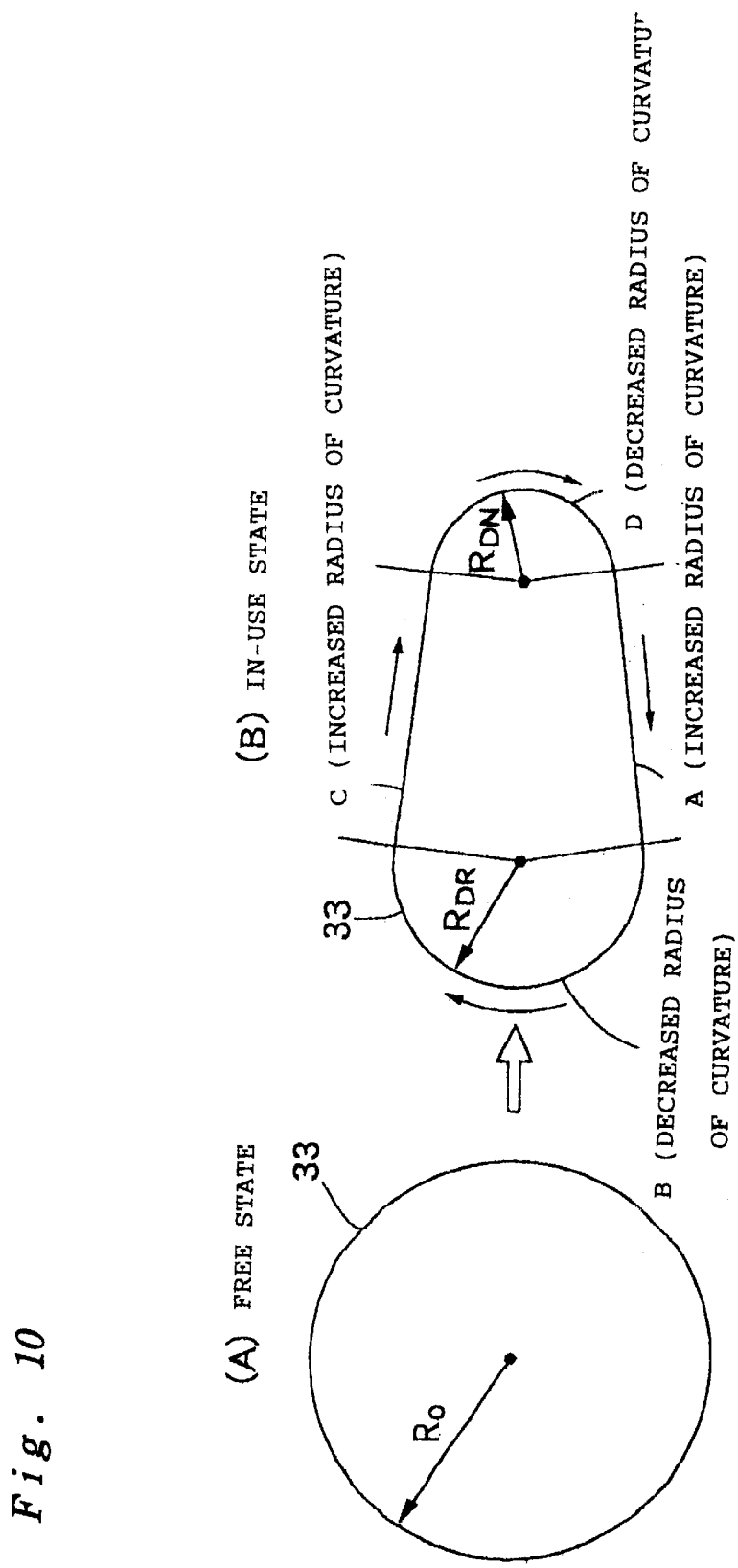
FIG. 10 is a diagram of the shape of the metal ring sheets when in a free state-and an in-use state.

Stress arising from the flexing of the metal ring sheets acts on the metal rings in addition to the tensile stress arising from tension as discussed above. As shown in FIG. 10, the metal ring sheets are round when in a free state, but when in an in-use state they are deformed into a shape having the above-mentioned regions A through D. In the return arc section (region A) and the outgoing arc section (region C), the radius of curvature which was R0 in a free state increases to infinity, in region B, where the V-belt is looped around the drive pulley, the radius of curvature decreases to $R_{DR}$ (<R0), and in region D, where the V-belt is looped around the driven pulley, the radius of curvature decreases to $R_{DN}$ (<R0).

In regions A and C, where the radius of curvature of the metal ring sheets increases, tensile flexural stress acts on the inner peripheral surfaces of the metal ring sheets, and compressive flexural stress acts on the outer peripheral surfaces. Meanwhile, in regions B and D, where the radius of curvature of the metal rings decreases, compressive flexural stress acts on the inner peripheral surfaces of the metal ring sheets, and tensile flexural stress acts on the outer peripheral surfaces. These compressive and tensile flexural stresses arising from flexing are the same for all the metal ring sheets, including the innermost metal ring sheet.

Figure 11:
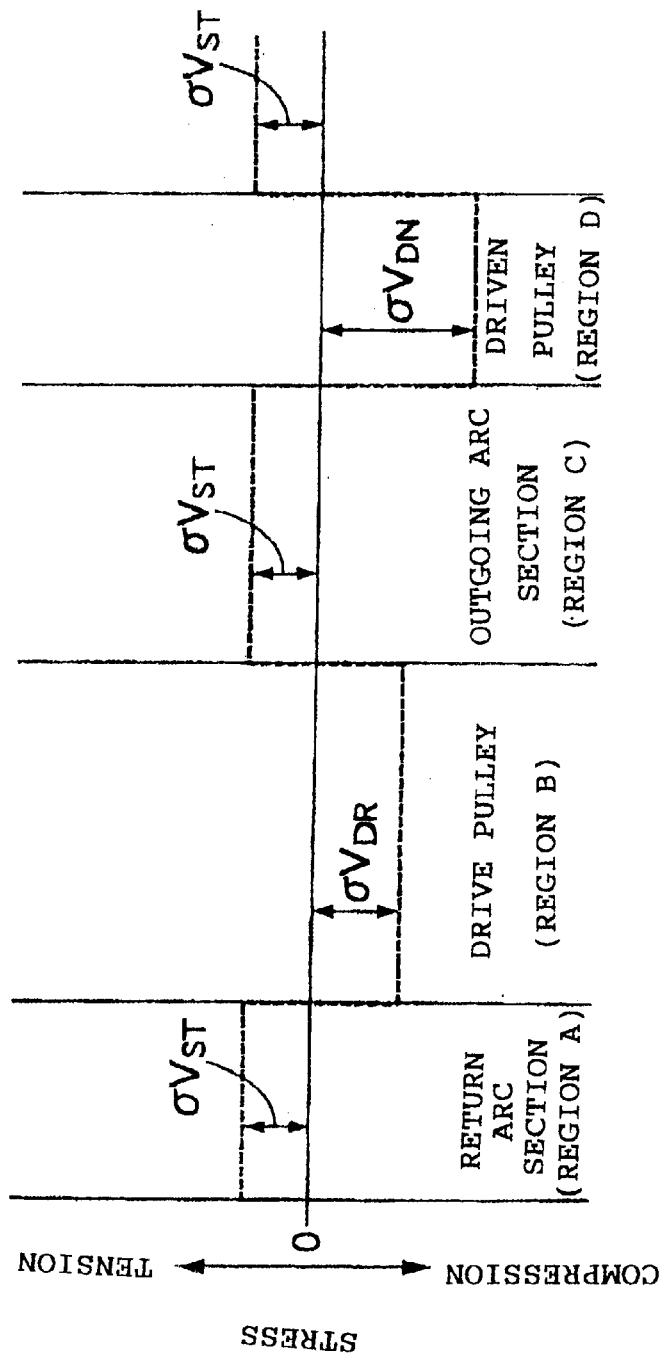
FIG. 11 is a graph of the changes in the flexural stress that acts on the inner peripheral surface of the metal ring sheets.

The graph in FIG. 11 shows the flexural stress acting on the inner peripheral surfaces of the 12 metal ring sheets when the vehicle is in its highest-speed mode of travel as shown in FIG. 6. As is clear from the graph, a constant tensile flexural stress $\sigma V_{ST}$ acts on the inner peripheral surface of each of the metal ring sheet in the arc sections (regions A and C), a relatively small compressive flexural stress $\sigma V_{DR}$ acts in region B, where the V-belt is looped around the drive pulley with the larger radius of curvature, and a relatively large compressive flexural stress $\sigma V_{DN}$ acts in region D, where the V-belt is looped around the driven pulley with the smaller radius of curvature.

Figure 12:
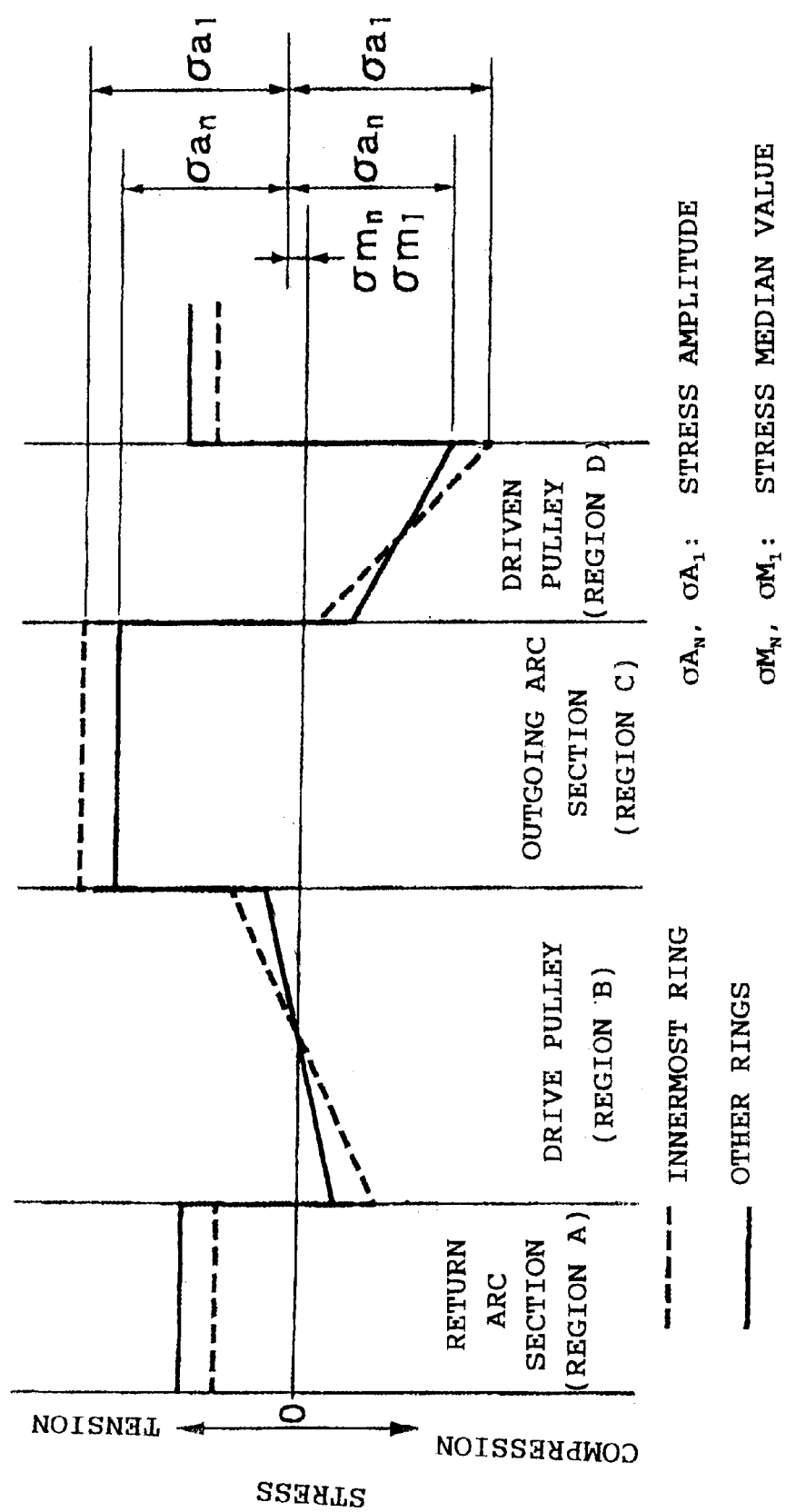
FIG. 12 is a graph of the changes in the total stress that acts on the inner peripheral surface of the metal ring sheets.

In the graph in FIG. 12, the stress acting on the basis of the tension of the metal ring sheets shown in FIG. 9 is added to the stress acting on the inner peripheral surfaces of these metal ring sheets on the basis of the flexing of the metal ring sheets shown in FIG. 11. The thick broken line indicates the change in total stress acting on the inner peripheral surface of the innermost metal ring sheet, and the solid line indicates the change in total stress acting on the inner peripheral surfaces of the other metal ring sheets. As is clear from this figure, the median value $\sigma m1$ of the stress amplitude of the innermost metal ring sheet is the same as the median value $\sigma mn$ of the stress amplitude of the other metal ring sheets, but the stress amplitude $\sigma a1$ of the innermost metal ring sheet is greater than the stress amplitude $\sigma an$ of the other metal ring sheets. The difference between the stress amplitude $\sigma a1$ and $\sigma an$ originates in the difference between the tensile stress change amount $\Delta \sigma T1$ of the innermost metal ring sheet and the tensile stress change amount $\Delta \sigma Tn$ of the other metal ring sheets as described for FIG. 9.

Since a repeated load acts on the metal ring sheets in the pattern shown in FIG. 12, the fatigue life of the innermost metal ring sheet, which has a large stress amplitude, is shorter than the fatigue life of the other metal ring sheets. This is indicated by the fatigue limit graph shown in FIG. 13. The mean stress (stress median value) $\sigma m1=\sigma mn$, but the fatigue life L1 of the innermost metal ring sheet, which is subjected to a greater stress amplitude ($\sigma a1$), is shorter than the fatigue life Ln of the other metal ring sheets, which are subjected to a smaller stress amplitude ($\sigma an$).

The above description was for when the thickness was the same for all of the metal ring sheets, but in the present invention just the innermost metal ring sheet 33(1) is made thinner. The other metal ring sheets 33(2) to 33(n), however, all have the same thickness, and the thickness of the various sheets is set such that the total thickness of the metal ring 31 does not change.

Doing this allows the flexural stress of the innermost metal ring sheet to be reduced, the stress amplitude σa1 to be reduced, and the fatigue life thereof to be increased. This is described below.

Here, as described above, the coefficient of friction ratio Mr is usually greater than 1.0, so the tension change to which the innermost metal ring sheet 33(1) is subjected is greater than that of the other metal ring sheets 33(2) to 33(n) (see FIG. 8). Accordingly, if the thickness of the innermost metal ring sheet 33(1) is reduced, there will be an increase in the tensile stress change amount ΔσT1 produced by tension changes. If the thickness of the innermost metal ring sheet 33(1) is thus reduced, flexural stress will be lower, but there will be more change in the amount of tensile stress, so these two factors must be taken into account and the thickness set such that the fatigue life can be increased for all of the metal rings. For example, in FIG. 13, the thickness of the innermost metal ring sheet must be reduced such that the stress conditions at point P1 will change to those indicated by point P1', and the thickness must be set so as to increase the fatigue life form L1 to L1'.

Figure 14:
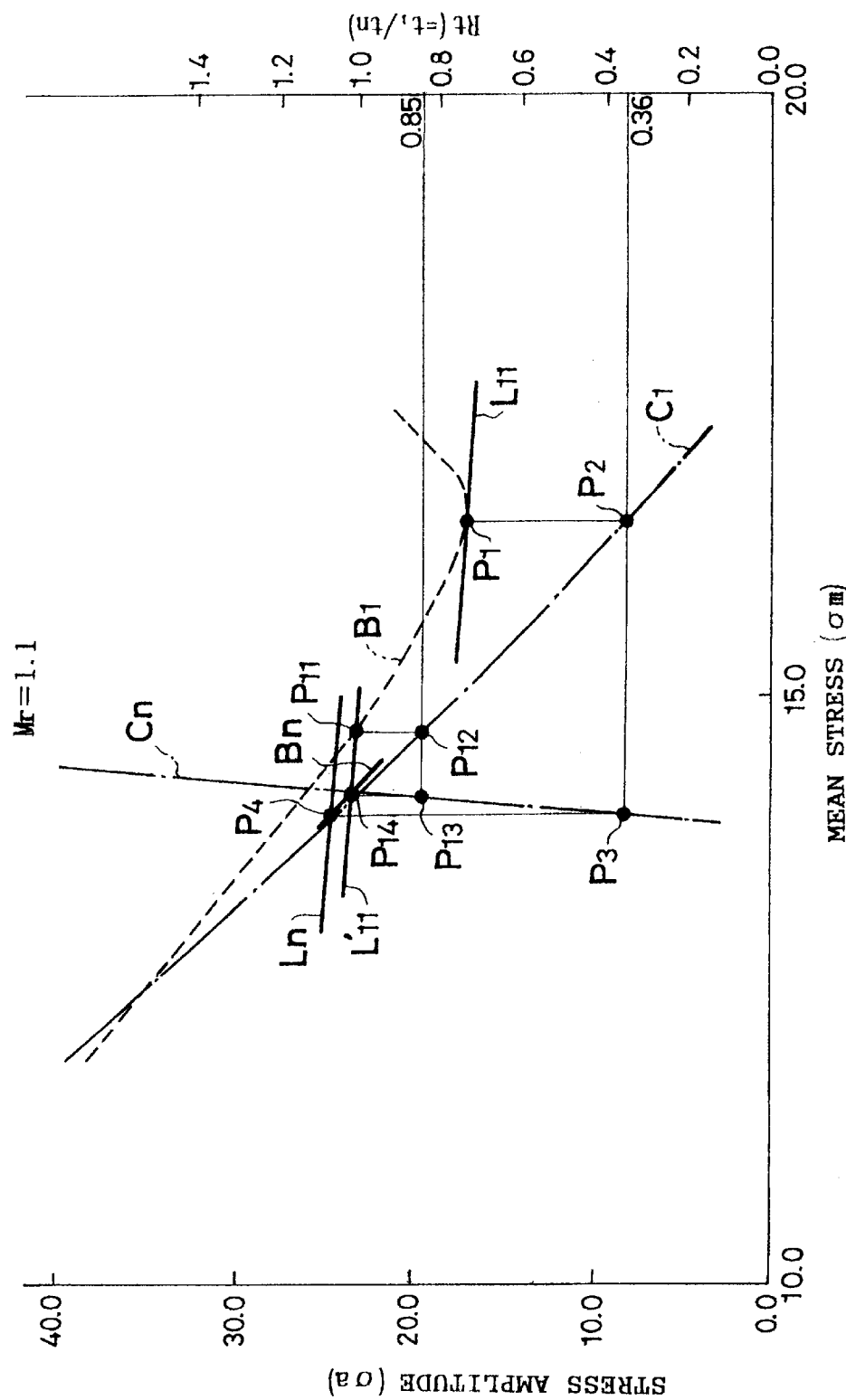
FIG. 14 is a graph of the relation between the fatigue limit graph and the thickness Ratio Rt when the coefficient of friction ratio Mr=1.1.

In view of this, the inventors first varied the thickness of the innermost metal ring sheet 33(1) and computed the mean stress (σm) and the stress amplitude (σa) acting on each metal ring sheet of the metal V-belt when the coefficient of friction ratio Mr is 1.1 and [the system] is driven under specific conditions. These results are compiled in the graph of FIG. 14. The drive conditions used in the computation were a rotational speed of 6000 rpm and a drive torque of 14.3 kg-m at the drive pulley 6. In this graph, the scale of the left vertical axis indicates the stress amplitude σa, the horizontal axis indicates the mean stress σm, and the right scale of the vertical axis indicates the thickness ratio Rt of the metal ring sheets (=t1/tn, where t1 is the thickness of the innermost metal ring sheet, and tn is the thickness of the other metal ring sheets).

The broken line B1 is a plot of the results of computing the changes in the stress amplitude σm and mean stress σm produced at the innermost metal ring sheet 33(1) when the thickness ratio Rt is varied. Similarly, the solid line Bn is a plot of the results of computing the changes in the stress amplitude σm and mean stress σm produced at the other metal ring sheets 33(n). More precisely, the computation was for the second metal ring sheet from the inside 33(2) as a representative of the other metal ring sheets. The chain line C1 indicates the relationship between the thickness ratio Rt and the various points on the broken line B1, and the chain line Cn indicates the relationship between the thickness ratio Rt and the various points on the solid line Bn. Accordingly, the thickness ratio Rt is indicated by the position of the intersection point P2 of the chain line Cn and a vertical line dropped from point P1 of the broken line B1, and in this case Rt=0.36. The relationship between the thickness ratio and the stress of the other metal ring sheets is indicated by the intersection point P3 of the chain line Cn and this line indicating that the thickness ratio Rt=0.36, and the stress of the other metal ring sheets is indicated by the intersection point P4 of the solid line Bn and a vertical line passing through this point P3.

Figure 13:
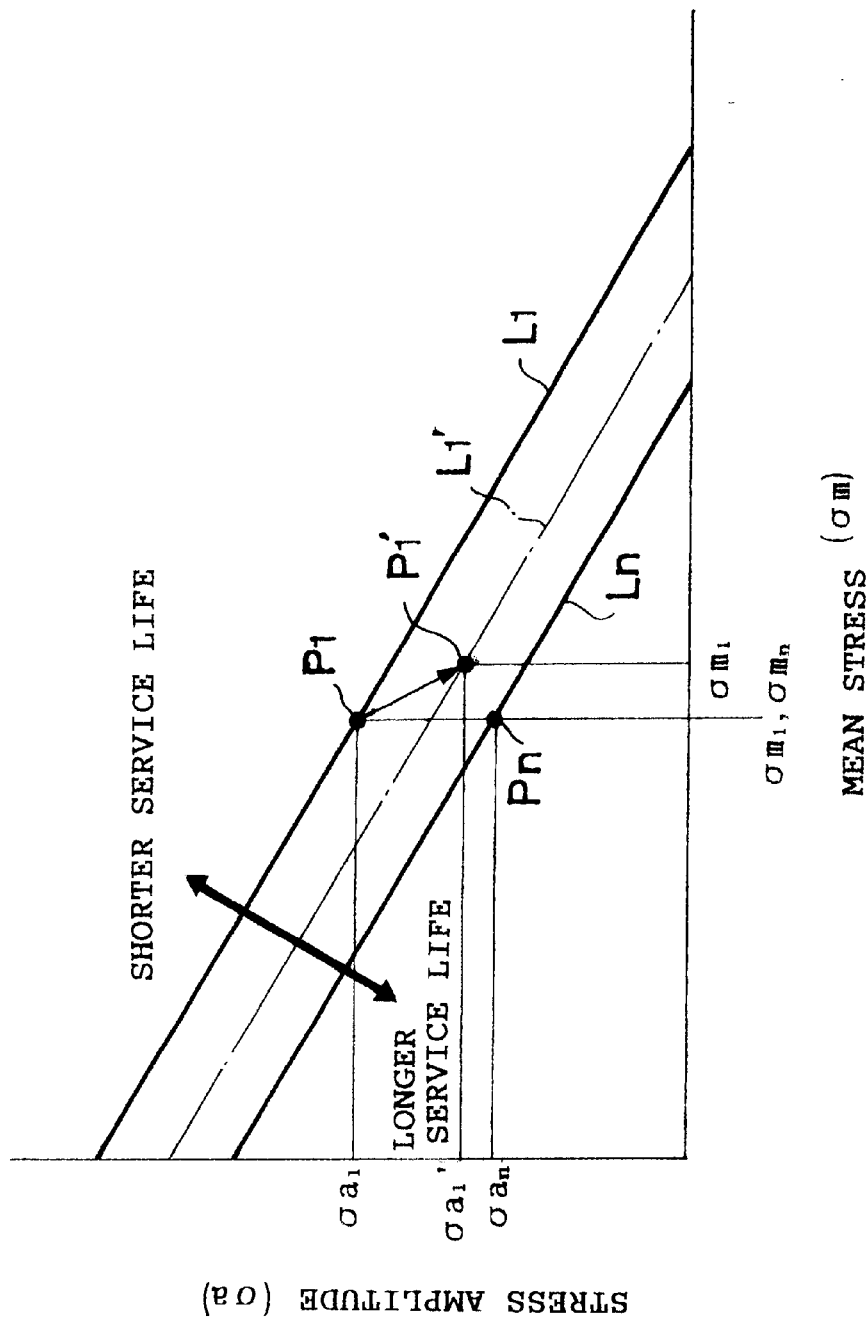
FIG. 13 is a fatigue limit graph for the metal ring sheets.

In this example, the metal ring sheets are all made from maraging steel, in which case the slope of the constant- life lines L1 and Ln in the fatigue limit graph of FIG. 13 is (−¼). If view of this, if we draw a constant-life line L11 that has the same slope as the above constant-life lines and that is tangent to the bottom of the broken line B1, then the fatigue life of the innermost metal ring sheet 33(1) is at its maximum under the stress conditions at this point of tangency P1. Since, as mentioned above, the thickness ratio Rt here is 0.36, setting this thickness ratio will result in the maximum fatigue life of the innermost metal ring sheet.

The stress conditions of the other metal ring sheets here are indicated by point P4, and the constant-life line Ln1 that passes through this point P4 is the fatigue life of the other metal ring sheets. As can be seen from a comparison of the constant-life lines L11 and Ln1, if we assume the thickness ratio Rt to be 0.36, then the fatigue life of the innermost metal ring sheet is shorter than the fatigue life of the other metal ring sheets, so this thickness ratio is undesirable. In view of this, if we determine by trial and error the point at which the fatigue lives are roughly the same, we find the constant-life line L11' shown in the figure, and in this case the thickness ratio Rt is 0.85, as can be seen by following points P11, P12, P13, and P14. Specifically, when the coefficient of friction ratio Mr is 1.1, the fatigue life of the metal ring 31 as a whole can be maximized by setting the thickness ratio Rt to 0.85.

Figure 15:
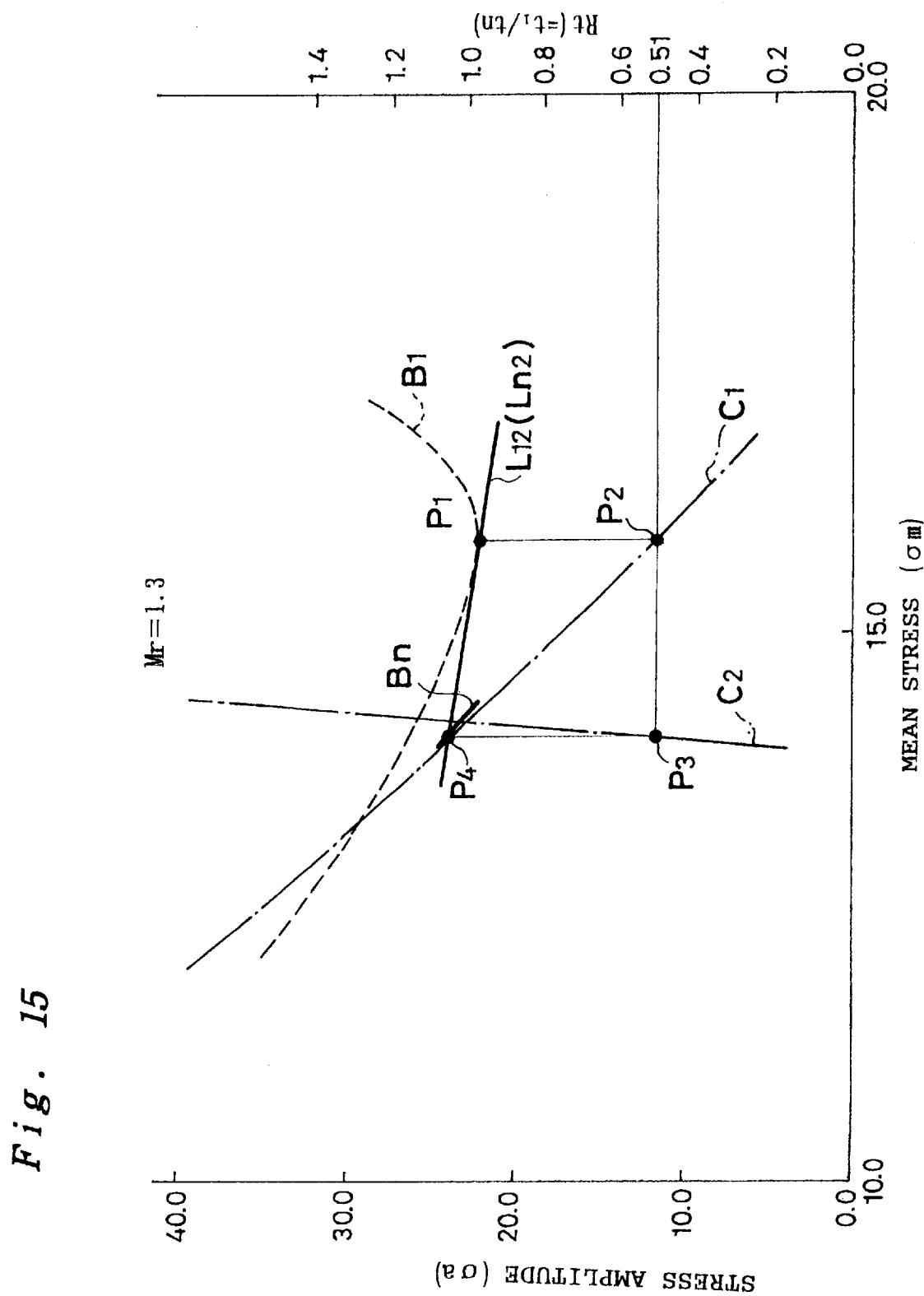
FIG. 15 is a graph of the relation between the fatigue limit graph and the thickness Ratio Rt when the coefficient of friction ratio Mr=1.3.

Next, FIG. 15 shows the results of performing the same computations as above when the coefficient of friction ratio Mr is 1.3. Again in this figure, the broken line B1 is a plot of the results of computing the changes in the stress amplitude σm and mean stress σm produced at the innermost metal ring sheet 33(1) when the thickness ratio Rt is varied. The solid line Bn is a plot of the results of computing the changes in the stress amplitude σm and mean stress σm produced at the other metal ring sheets 33(n). The chain line C1 indicates the relationship between the thickness ratio Rt and the various points on the broken line B1, and the chain line Cn indicates the relationship between the thickness ratio Rt and the various points on the solid line Bn.

Here again, if we draw a constant-life line L11 that has the same slope (−¼) as the constant-life lines L1 and Ln in the fatigue limit graph of FIG. 13 and that is tangent to the bottom of the broken line B1, then the fatigue life of the innermost metal ring sheet 33(1) is at its maximum under the stress conditions at this point of tangency P1. Since, as shown in the figure, the thickness ratio Rt here is 0.51, setting this thickness ratio will result in the maximum fatigue life of the innermost metal ring sheet.

The stress conditions of the other metal ring sheets here are indicated by point P4, and are located on the above-mentioned constant-life line L12 (the constant-life line Ln2 that passes through point P4 lies on the constant-life line L12. Specifically, when the coefficient of friction ratio Mr is 1.3, the fatigue life of the innermost metal ring sheet can be maximized by setting the thickness ratio Rt to 0.51, and the fatigue life of the other metal ring sheets will be the same as this.

Figure 16:
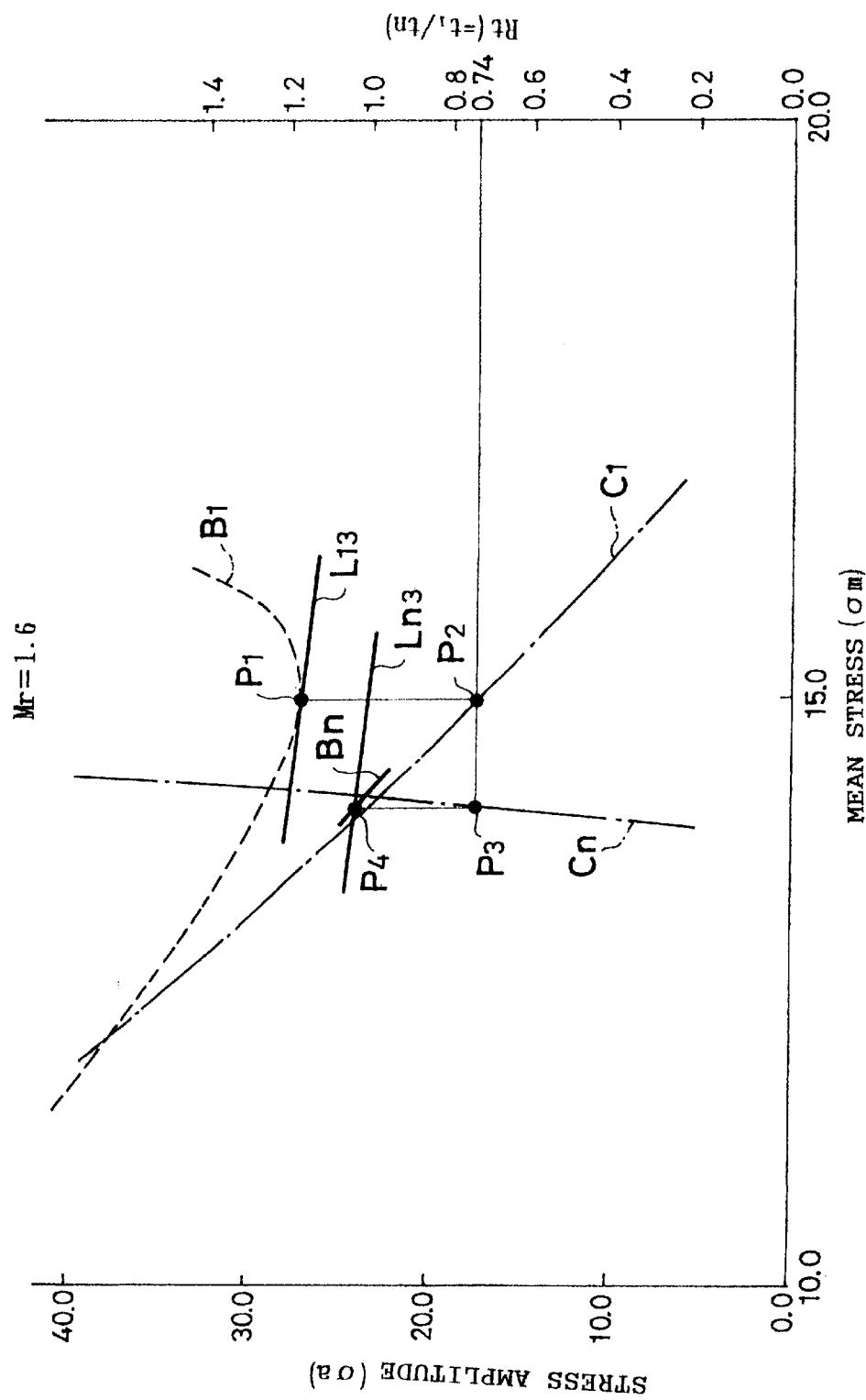
FIG. 16 is a graph of the relation between the fatigue limit graph and the thickness Ratio Rt when the coefficient of friction ratio Mr=1.6.

FIG. 16 shows the results of performing the same computations as above when the coefficient of friction ratio Mr is 1.6. Here again, if we draw a constant-life line L13 that has the same slope (−¼) as the constant-life lines L1 and Ln in the fatigue limit graph of FIG. 13 and that is tangent to the bottom of the broken line B1, then the fatigue life of the innermost metal ring sheet 33(1) is at its maximum under the stress conditions at this point of tangency P1. As shown in the figure, the thickness ratio Rt here is 0.74, so the maximum fatigue life of the innermost metal ring sheet can be achieved by setting this thickness ratio.

The stress conditions of the other metal ring sheets here are indicated by point P4, and the constant-life line Ln3 that passes through this point P4 indicates the fatigue life of the other metal ring sheets. As can be seen from a comparison of the constant-life lines L13 and Ln3, the other metal ring sheets have a longer service life under these conditions. Meanwhile, since the innermost metal ring sheet is set to a thickness ratio at which the maximum service life will be obtained, in this case the optimal setting for the thickness ratio Rt is 0.74.

Figure 17:
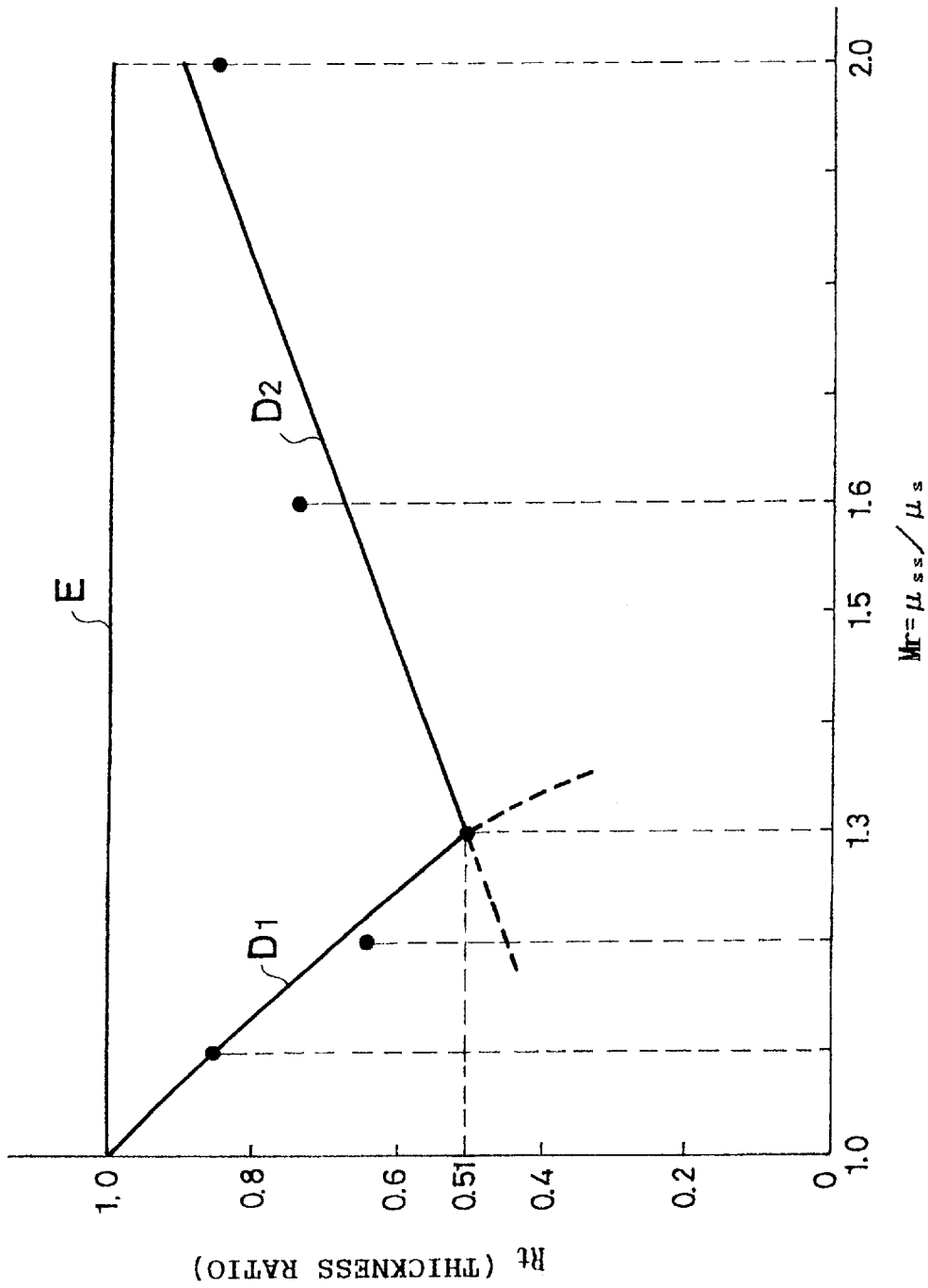
FIG. 17 is a graph of the relation between the thickness Ratio Rt and the coefficient of friction ratio Mr.

FIG. 17 is a compilation of the results of computing the optimal thickness ratio Rt for various coefficient of friction ratios Mr as discussed above. When the coefficient of friction ratio Mr is less than 1.3, the service life of the other metal ring sheets will be shorter than the service life of the innermost metal ring sheet at the thickness ratio setting at which the service life of the innermost metal ring sheet is at its maximum, so a thickness setting that will prevent this is required, and the thickness ratio Rt indicated by the line D1 is set. Meanwhile, when the coefficient of friction ratio Mr is greater than or equal to 1.3, the service life of the other metal ring sheets will be longer at the thickness ratio setting at which the service life of the innermost metal ring sheet is at its maximum, so the thickness ratio is set so that the service life of the innermost metal ring sheet will be at its maximum, and this setting is indicated by the line D2. Line E indicates the case when all the metal ring sheets, including the innermost metal ring sheet, are of the same thickness (that is, in the case of a conventional thickness setting).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

RELATED APPLICATIONS

The application claims the priority of Japanese Patent Application No.10-179959 filed on Jun. 26, 1998, which is incorporated herein by reference.

What is claimed is:

1. A metal V-belt for transmitting power, when looped between a drive pulley and a driven pulley, comprising:

at least one endless belt-form metal ring member; and numerous metal element members supported along this metal ring member, wherein said metal ring member comprises a plurality of thin, endless belt-form metal ring sheets superposed in the radial direction, and of these plurality of metal ring sheets, a thickness of an innermost metal ring sheet is set to be less than the thickness of the other metal ring sheets, and wherein the thickness of said innermost metal ring sheet is set on the basis of the ratio of the coefficient of friction between said innermost metal ring sheet and said metal element members to the coefficient of friction between said other metal ring sheets.

2. The metal V-belt according to claim 1, wherein a repeated stress amplitude σ a and a mean stress σ m applied to said innermost metal ring sheet when the V-belt is looped between said drive pulley and said driven pulley to transmit power are taken into account, and the thickness of said innermost metal ring sheet is set so as to maximize the fatigue life of said innermost metal ring sheet when repeatedly subjected to the stress amplitude σ a and the mean stress σ m.

3. The metal V-belt according to claim 2, wherein the thickness of said innermost metal ring sheet is set so as to maximize the fatigue life of said innermost metal ring sheet, as long as the fatigue life of the innermost metal ring sheet, produced by the repeated load acting thereon when the V-belt is looped between the drive pulley and the driven pulley to transmit power, is less than the fatigue life of the other metal ring sheets.

4. The metal V-belt according to claim 1, wherein said metal ring member comprises 12 of said ring sheets superposed in the radial direction.

5. A belt transmission having a metal V-belt for transmitting power, looped between a drive pulley and a driven pulley, comprising:

an endless belt-form metal ring member; and numerous metal element members supported along this metal ring member, wherein said metal ring member comprises a plurality of thin, endless belt-form metal ring sheets superposed in the radial direction, and of these plurality of metal ring sheets, a thickness of an innermost metal ring sheet is set to be less than the thickness of the other metal ring sheets;

wherein the thickness of said innermost metal ring sheet is set on the basis of the ratio of the coefficient of friction between said innermost metal ring sheet and said metal element members to the coefficient of friction between said other metal ring sheets;

wherein said drive pulley comprises a drive-side stationary half and a drive-side movable half, said metal element members are sandwiched between these two pulley halves, and said drive-side movable pulley half is controlled so as to move in the axial direction, which causes said metal element members to move in the radial direction and varies the loop radius of said metal V-belt with respect to said drive pulley;

said driven pulley comprises a driven-side stationary half and a driven-side movable half, said metal element members are sandwiched between these two pulley halves, and said driven-side movable pulley half is controlled so as to move in the axial direction, which causes said meal element members to move in the radial direction and varies the loop radius of said metal V-belt with respect to said driven pulley; and the gear ratio between said drive pulley and said driven pulley is continuously variable.

6. The metal V-belt according to claim 1, wherein said metal element members are made in a shape having a body with V-surfaces on the left and right ends, and ears that extend upward and out to the left and right from the center of this body, a smooth saddle surface is formed on left and right upper surfaces of the body, a smooth support surface is formed on each of the lower surfaces of the left and right ears, and a pair of slots is formed in between the saddle surfaces and the support surfaces; and said at least one metal ring member comprises two metal ring members, each inserted into respective slots of said pair of slots, so that numerous said metal element members are disposed along said metal ring member.

7. A metal V-belt for transmitting power, with looped between a drive pulley and a driven pulley, comprising:

at least one endless belt-form metal ring member; and numerous metal element members supported along this metal ring member, said metal ring member comprising a plurality of thin, endless belt-form metal ring sheets superposed in the radial direction, and of these plurality of metal ring sheets, a thickness of an innermost metal ring sheet is set to be less than the thickness of the other metal ring sheets; and wherein a repeated stress amplitude σ a and a mean stress σ m applied to said innermost metal ring sheet when the V-belt is looped between said drive pulley and said driven pulley to transmit power are taken into account, and the thickness of said innermost metal ring sheet is set so as to maximize the fatigue life of said innermost metal ring sheet when repeatedly subjected to the stress amplitude σ a and the mean stress σ m.

8. The metal V-belt according to claim 7, wherein the thickness of said innermost metal ring sheet is set so as to maximize the fatigue life of said innermost metal ring sheet, as long as the fatigue life of the innermost metal ring sheet, produced by the repeated load acting thereon when the V-belt is looped between the drive pulley and the driven pulley to transmit power, is less than the fatigue life of the other metal ring sheets.

* * * * *